United States Patent [19]

Hare, Sr.

[11] Patent Number: 4,930,463
[45] Date of Patent: Jun. 5, 1990

[54] ELECTRO-RHEOLOGICAL VALVE CONTROL MECHANISM

[76] Inventor: Nicholas S. Hare, Sr., 252 Pineville Rd., Monroeville, Ala. 36460

[21] Appl. No.: 399,178

[22] Filed: Aug. 28, 1989

Related U.S. Application Data

[63] Continuation-in-part of Ser. No. 339,748, Apr. 18, 1989, abandoned.

[51] Int. Cl.$^5$ .......................... F01L 9/04; F01L 13/00
[52] U.S. Cl. .................. 123/90.11; 123/90.6; 123/90.48; 123/182; 123/321; 123/90.12
[58] Field of Search .............. 123/90.11, 90.12, 90.48, 123/90.49, 90.6, 182, 321; 74/567, 568 R

[56] References Cited

U.S. PATENT DOCUMENTS

| | | | |
|---|---|---|---|
| 3,277,874 | 8/1965 | Wagner | 123/90.16 |
| 3,304,925 | 6/1966 | Rhoads | 123/90.55 |
| 3,381,676 | 5/1968 | Campen | 123/182 |
| 3,395,689 | 8/1968 | Kruse | 123/182 |
| 3,490,423 | 1/1970 | Shunta et al. | 123/90.16 |
| 3,511,219 | 5/1970 | Esty | 123/182 |
| 3,742,921 | 7/1973 | Rendine | 123/90.16 |
| 3,786,792 | 1/1974 | Pelizzoni et al. | 123/90.17 |
| 3,809,033 | 5/1974 | Cartledge | 123/90.46 |
| 3,817,228 | 6/1974 | Bywater | 123/90.12 |
| 3,964,455 | 6/1976 | Brown | 123/90.43 |
| 4,133,332 | 1/1979 | Benson et al. | 123/90.16 |
| 4,161,306 | 7/1979 | Brune et al. | 123/32 AB |
| 4,258,671 | 3/1981 | Takizawa et al. | 123/90.16 |
| 4,393,832 | 7/1983 | Samuel et al. | 123/90.14 |
| 4,452,187 | 6/1984 | Kosuda et al. | 123/90.16 |
| 4,485,780 | 12/1984 | Price et al. | 123/90.15 |
| 4,515,343 | 5/1985 | Pischinger | 123/90.11 |
| 4,593,658 | 6/1986 | Moloney | 123/90.11 |
| 4,700,678 | 10/1987 | Elliott | 123/297 |
| 4,744,914 | 5/1988 | Filisko et al. | 252/74 |
| 4,772,407 | 9/1988 | Carlson | 252/74 |
| 4,840,112 | 6/1989 | Bhadra et al. | 91/459 |

OTHER PUBLICATIONS

Electro-Rheological Fluid Devices Near Commercial Stage, Scott and Yamaguchi, Automotive Engineering, Nov., 1985.
Electro-Rheological Fluids & Devices, Automotive Engineering, Dec., 1988.
"Inventors: Got a Use for Liquid that Turns Solid?" Williams, Automotive Industries, vol. 167, p. 28, Jan., 1987.

*Primary Examiner*—Charles J. Myhre
*Assistant Examiner*—Weilun Lo
*Attorney, Agent, or Firm*—Ferrill and Logan

[57] ABSTRACT

An electro-rheological valve controller. The invention comprises a generally cylindrical casing holding an electro-rheological fluid; a reciprocating tappet attached at one end of the cylindrical casing, said tappet contacting cam means for thrusting said tappet into said casing toward a reciprocating valve lift member; a plunger member coupled to said tappet, said plunger being perforated to permit the flow of electro-rheological fluid therethrough; a reciprocating valve lift member situated within said casing and separated from said perforated plunger member by a biasing spring and said elecro-rheological fluid, said lift member communicating with a valve to be lifted; and electrode means coupled to said perforated member for generating an elecric field within said perforated member such that said electro-rheological fluid within said perforated member solidifies, whereby said plunger applies a compressive fluid force against said reciprocatring lift member thereby lifting said valve to be lifted. In an alternative embodiment, the unique electrode configurations of the present invention are utilized in a valve controller with a by-pass conduit.

28 Claims, 12 Drawing Sheets

— FIG. 3 —

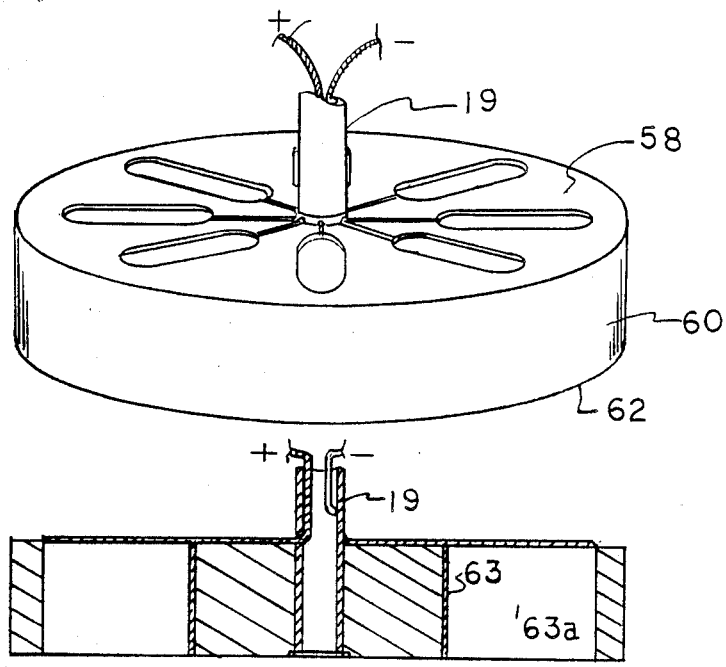
FIG.6
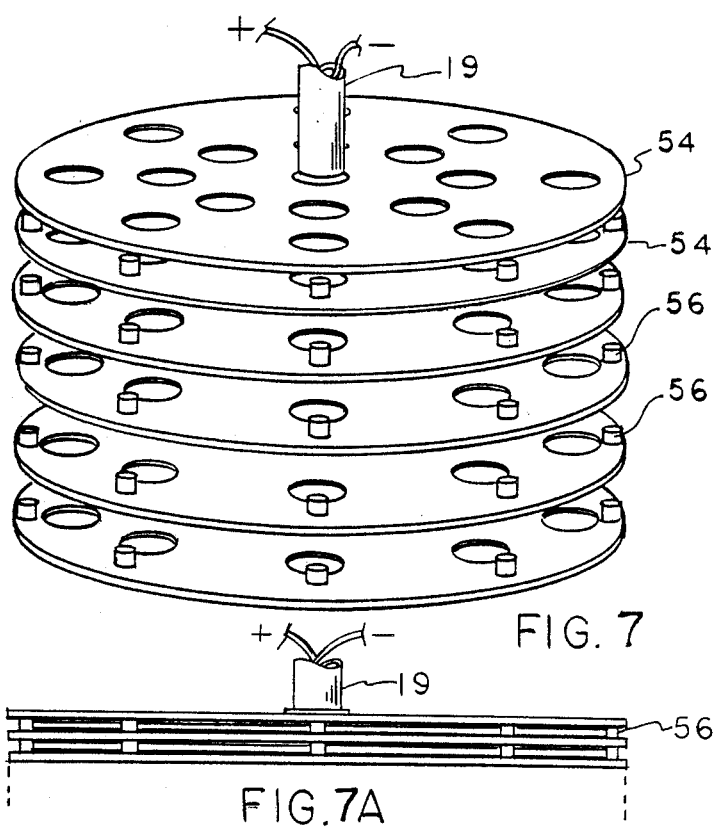
FIG. 7
FIG.7A

ELECTRO-RHEOLOGICAL VALVE CONTROL MECHANISM

RELATED APPLICATIONS AND CLAIM OF PRIORITY

This Application is a Continuation-in-Part of U.S. Ser. No. 339,748, filed Apr. 18, 1989, now abandoned.

FIELD OF THE INVENTION

The present invention is directed to devices incorporating electroviscous and electro-rheological fluids for use in gasoline and diesel powered engines. Specifically, the present invention is directed to novel valve control and electrode mechanisms and configurations for electrifying electro-rheological fluids for use in valve timing, lift, control and compression braking in diesel and gasoline automotive engines.

BACKGROUND OF THE INVENTION

It has been well understood for many years that the performance of piston operated internal combustion engines can be substantially improved by varying the valve lift and/or timing in accordance with engine speed and power. While there is no simple mechanical means for adjusting valve cam profiles, it has been recognized that valve lift variation can be achieved, by varying the level and timing of the valve lifter. The importance of varying valve timing, lift, dwell and overlap to meet different operating conditions has long been recognized. Cams profiled for smooth engine operation at low and moderate speeds do not provide efficiency at high speeds. Conversely, cams profiled for high speeds, power and acceleration do not perform efficiently at low speeds, and tend to run rough, provide poor fuel economy, and create greater air pollution. Numerous mechanisms have been developed to provide variable valve timing and lift in diesel and gasoline engines. Typical prior art devices have employed mechanical, hydraulic or solenoid activated mechanisms.

A first type of device operates by effectuating small changes in the over-all length of the lifter. A second type employs a two position system, i.e. a low position (minimum unit extension), and a high position (maximum unit extension). A third type of prior art valve lift device continuously alters valve lifter position, while a fourth type operates by completely deactivating the associated valve. In the Cadillac Modular Displacement System, for example, selected valves are deactivated/activated by shifting rocker arm pivot points by an electric solenoid to remove a selected cylinder completely from operation. Numerous patents for "split engine" operation such as Springer U.S. Pat. No. 4,284,042, Brown Pat. No. 3,964,455, Mueller U.S. Pat. No. 4,151,817 provide means for disabling the valves of selected cylinders. Patents providing selective operation of multi-lobe cams include Wagner U.S. Pat. No. 3,277,874 and Hausknecht U.S. Pat. No. 4,134,371. Additional hydraulic valve deactivation mechanisms are disclosed in U.S. Pat. Nos. 4,442,806 and 4,515,121.

Each of these conventional methods of controlling valve lift, timing and deactivation is complex and expensive. Each requires hydraulic or solenoid activated control systems which are often difficult to position, control, replace and repair. It would be desireable to have a simple valve controller wholly integral to the valve lift mechanism which could control valve lift and timing.

It has been recognized for several decades that certain fluids respond to the influence of an electric potential by evidencing a rapid and pronounced increase in viscosity and an increased resistance to shear. Such electro-rheological or electroviscous fluids comprise slurries of finely divided hydrophilic solids in hydrophobic liquids. In the absence of an electric field, these fluids behave in a Newtonian fashion, but when an electric field is applied, the fluids become proportionately more viscous as the potential of the electric field increases. In strong electric fields, these fluids can thicken into a solid. The electro-rheological phenomenon reverses when the electric potential is removed, and the material returns to its fluid state. Electro-rheological fluids change their characteristics very rapidly when electric fields are applied or released, with typical response times being on the order of one millisecond. The ability of electro-rheological fluids to respond rapidly to electrical signals makes them well suited as elements in mechanical devices. Patents directed to compositions of electro-rheological fluids include U.S. Pat. Nos. 3,367,872; 3,047,507 and 4,033,892. Electro-rheological fluids have been extensively used in clutches as disclosed, for example, U.S. Pat. Nos. 4,444,298 and 4,493,615, and more recently in shock absorbers and hydraulic applications.

Until recently, the practical application of electro-rheological fluids was limited to low temperature environments due to the previously required presence of water in the electro-rheological fluid. In a high temperature environment, the water in the fluid would vaporize and lead to corrosion. This strictly limited the use of electro-rheological fluids away from high temperature applications on or near gasoline and diesel powered automobile and truck engines and the like. Recently, the temperature problem has been minimized with advances in electro-rheological fluid technology such as those disclosed in U.S. Pat. Nos. 4,744,914 and 4,772,407. Electro-rheological devices, because of their special nature offer numerous advantages over mechanical valve control devices incorporating hydraulic, solenoid and cam operated action, such as that utilized in standard valve lifters.

Compression braking has also long been an important feature in heavy trucks, vehicles which operate in mountainous terrain, and racing vehicles. Compression braking is based upon the principle of utilizing engine compression as an energy pump to retard the speed of the pistons and drive shaft. Patents disclosing compression released engine retarders include Price U.S. Pat. No. 4,485,780, Cartledge U.S. Pat. 3,809,033, and Samuel U.S. Pat. 4,393,832. All disclose systems which halt fuel injection during the braking operation and open the exhaust valve to release compression when the piston is close to top of dead center (T.D.C.) position during the compression stroke in a four cycle engine. Each of these devices incorporate the use of complex and expensive hydraulic or solenoid structures (in addition to the standard valve lifters) for lifting the exhaust valve to induce compression braking. The embodiments of the electro-rheological valve control device disclosed herein can, in addition to controlling valve lift and timing, also be applied to create a safer, more reliable and less expensive compression braking mechanism.

In view of the above, it would be desirable to provide a novel valve lift and control mechanism incorporating electro-rheological fluids which can be used in a variety of gasoline and diesel engine applications which are currently performed by complex and expensive solenoid hydraulic and mechanical devices.

It would further be particularly desirable to provide a novel electro-rheological device which can function as a valve controller, lifter and timer and which can replace hydraulic, solenoid and mechanically actuated valve lifters such as those disclosed in U.S. Pat. Nos. 3,865,088 and 4,203,397.

It would further be desirable to provide an electro-rheological device having a novel electrode configuration situated within the device itself which facilitates compactness, control, and facilitates compatibility with the on-board computers and microprocessors found in modern automobiles and trucks.

It would further be desirable to provide a valve lift, timing and control mechanism which can simultaneously function as a compression braking mechanism for diesel engines.

It would further be desirable to provide a replaceable wear strip to alleviate tappet and cam spalling and to provide more convenient maintenance shims.

A principal object of this invention then is to provide an electro-rheological device for varying valve timing, control and lift in response to varying operating conditions such as changes in speed, acceleration, power demand, and temperature, so as to maximize overall efficiency, acceleration, speed and power, and so as to provide smoother operation at all speeds, reduced pollution and increased fuel economy.

Another object of the present invention is to provide a variable valve control unit which can be designed for partial lift in a preset number of positions (i.e. a high lift position or a low lift position), or alternatively to provide infinitely variable control between the high lift and low lift position.

A further object of the invention is to provide an electro-rheological device which permits the rapid deactivation of a selected valve to allow that valve to remain closed while the remainder of the valve gear operates normally.

Another object of the present invention is to provide a simple means for rendering selected valves operative or inoperative on demand, i.e., complete activation or deactivation.

A further object of the invention is to provide a method or system for improving the performance of multi-valve engines by timing one set of valves (i.e. one intake valve and one exhaust valve) being for normal operation with the other valve or set of valves (i.e. another intake valve or another pair of intake and exhaust valves) timed for maximum performance, acceleration and high speed and power, the first set of valves remaining in operation at all times and the second set of valves being activated and operating on demand for speed and acceleration.

Another object of the invention is to provide an electro-rheological valve control means which also serves to provide engine compression braking by use of the usual exhaust cam to open the exhaust valve at a predetermined time near the end of the piston exhaust stroke or at a time determined by the on-board computer microprocessor, and as a consequence, to absorb energy during compression and to dissipate it by releasing it into the exhaust system to provide a braking action.

A further object of the invention is to provide an electro-rheological valve lift mechanism which is self-contained and can easily be removed and replaced as a single unit.

A further object of the present invention is to provide an electro-rheological valve control mechanism which can be utilized in conjunction with conventional hydraulic valve lifters.

A still further object of the present invention is to provide an electro-rheological control apparatus which can be utilized on the cam and cam shaft.

SUMMARY OF THE INVENTION

In accordance with the present invention, an electro-rheological valve is disclosed. The invention comprises a generally cylindrical container for holding an electro-rheological fluid; a slidable tappet attached at one end of the cylindrical casing, said tappet being in communication with cam means for thrusting said tappet into said casing; a perforated flow-through piston member coupled to said tappet to permit the flow of electro-rheological fluid therethrough; a lift member situated within said casing and separated from said perforated member by a biasing spring and said electro-rheological fluid, the lift member being connected to a valve to be lifted; electrode means coupled to said perforated member for generating an electric field within said member such that said electro-rheological fluid within said member solidifies whereby a compressive fluid force is applied to the lift member which lifts the valve; and, of the cylindrical container in a by-pass conduit.

BRIEF DESCRIPTION OF THE FIGURES

The foregoing summary, as well as the following detailed description will be better understood when read in conjunction wit invention, there is shown in the drawings an embodiment which is presently preferred, it being understood, however, that this invention is not limited to the precise arrangement and instrumentalities as shown.

FIG. 4A illustrates an exploded view of the spiral ring electrode configuration utilized in the valve controller of the preferred embodiment.

FIG. 4C is a planar view of the spiral electrode along line A—A of FIG. 4A.

FIG. 4D is a section view of the spiral electrode configuration utilized in the preferred embodiment.

FIG. 6 illustrates a perforated or flow-through piston electrode configuration to be utilized in the valve controller of the preferred embodiment.

FIG. 7 illustrates an exploded view of the wafer electrode configuration to be utilized in the valve controller of the preferred embodiment.

FIG. 7A is a section view of the wafer electrode configuration of the preferred embodiment.

DETAILED DESCRIPTION OF THE PREFERRED EMBODIMENT

Figure 1:
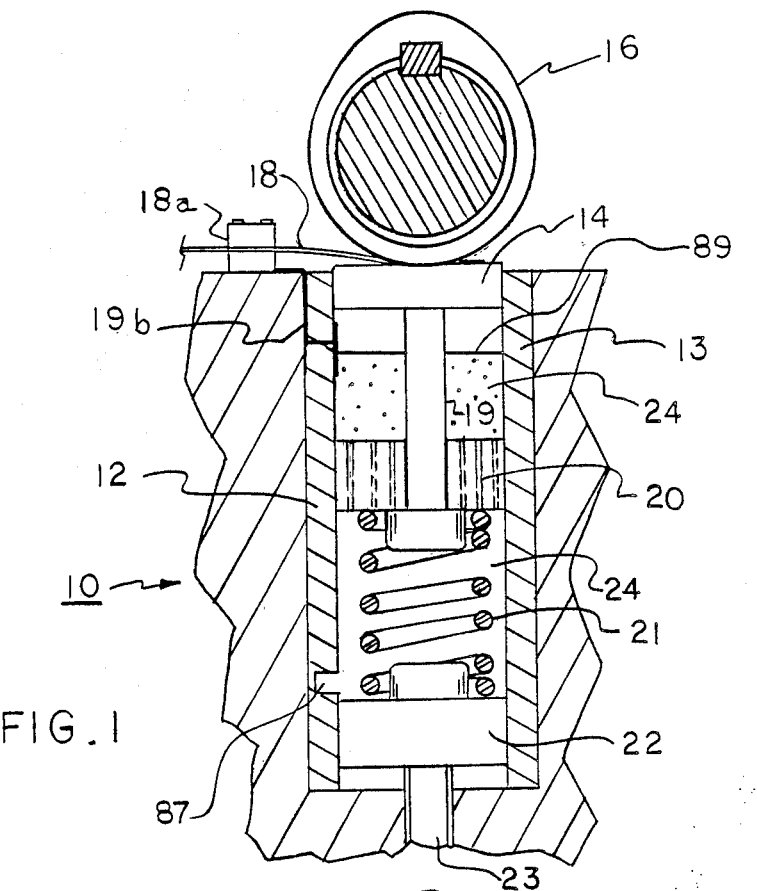
FIG. 1 is a section view of the valve controller of the preferred embodiment.
Figure 2:
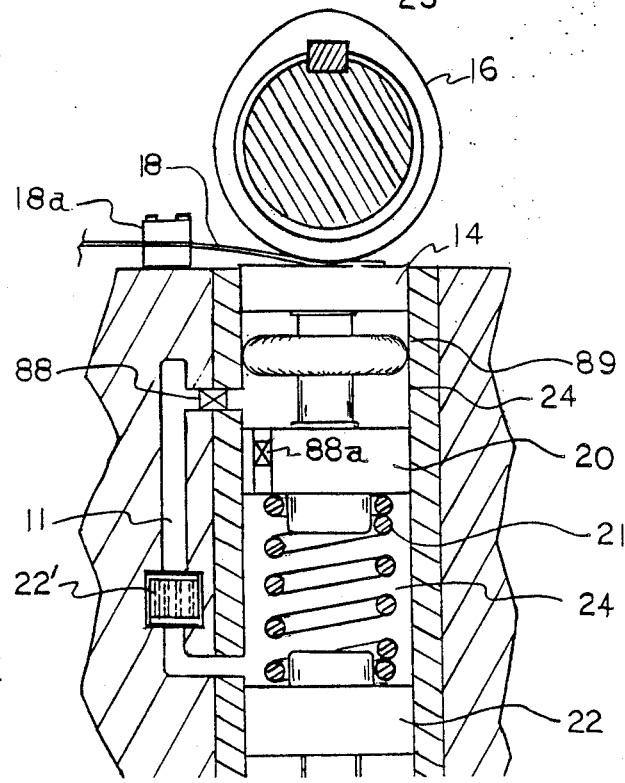
FIG. 2 is a section view of the valve controller of the second embodiment.
Figure 1A:
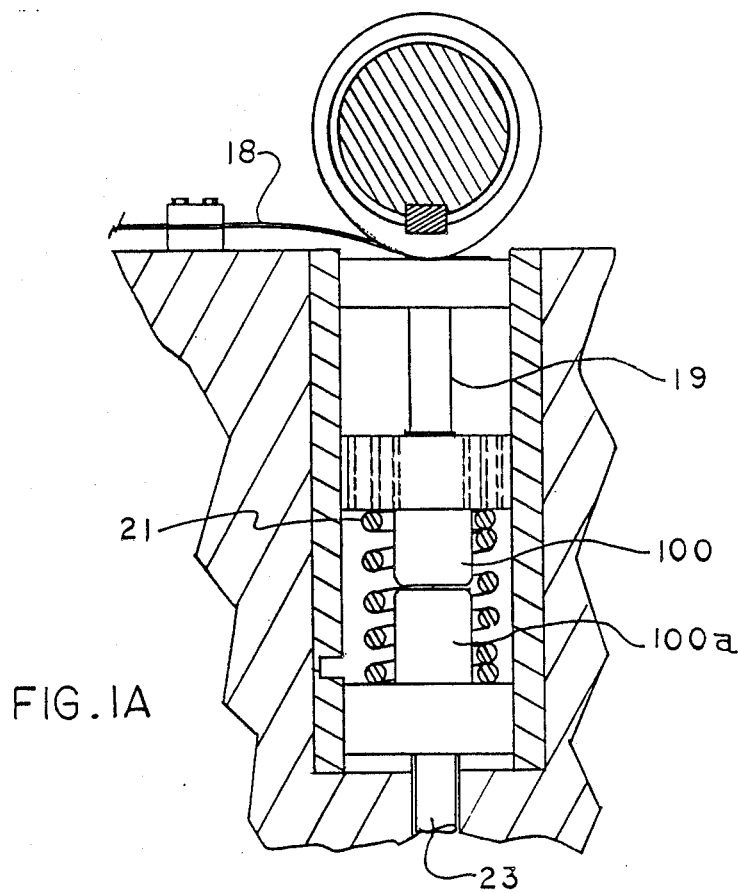
FIG. 1A is section view of the valve controller of the present invention utilized as a compression braking mechanism and also illustrating the wear strip.

The present invention is described with reference to the enclosed Figures wherein the same numbers are used where applicable. Referring to FIG. 1, the valve control mechanism 10 of the present invention is illustrated. The mechanism 10 can be utilized to lift an exhaust or intake valve in an internal combustion gasoline or diesel powered engine. In addition, it can be utilized to control other engine valving. As shown, the mechanism comprises a unit 10 which is retained within a seat 12. The valve controller comprises a substantially cylindrical housing 13 with a reciprocating tappet 14 which slides within the housing and which is retained in contact with a cam 16. The cam 16 is typically attached to the cam shaft of a four stroke internal combustion engine utilized in automobiles, diesel trucks and the like. As shown in FIGS. 1, 1A, and 2, a wear strip 18 is included to protect the tappet 14 and minimize friction. The wear strip 18 is composed of a thin flexible material and may contain internal electrode wires which, as will be described herein, can be utilized to electrify the electro-rheological fluid contained within the housing. The wear strip 18 is firmly attached to the lifter support by a two piece block 18a. In addition to housing the electrodes, the strip takes most of the wear resulting from the sliding contact of the rotating cam. The reciprocating tappet 14 is connected by a rod 19 to a perforated or flow-through piston member 20 which extends longitudinally into housing 13. Rod 19 contains the electric wire or wires which, as will be described herein, are utilized to electrify the electro-rheological fluid contained within the housing. A second reciprocating valve lifter member 22 retained within the housing is separated from the tappet 14 and perforated piston member 20 by a biasing spring 21 and the electro-rheological fluid contained within the housing. Valve lift member 22 pushes against a valve train 23. Biasing spring 21 biases the tappet 14 against the cam 16.

Housing 13 is filled with electro-rheological fluid 24. Electro-rheological fluids comprise slurries of finely divided hydrophilic solids in hydrophobic liquids. In the absence of an electric field, these fluids behave in Newtonian fashion, but when an electric field is applied, the fluids become more viscous as the potential of the electric field increases. The phenomenon reverses when the electric potential is removed, and the material returns to its fluid state. In strong electric fields, the fluid may thicken into a solid.

There are numerous electro-rheological fluids which have been developed. Preferably, the present invention should be utilized with electro-rheological fluids which are designed to operate in high temperature environments such as those disclosed in U.S. Pat. No. Nos. 4,744,914 and 4,772,407, and which are incorporated herein by reference. As will be described in greater detail herein, the reciprocating perforated piston member 20 functions as an electrode which solidifies the electro-rheological fluid. The housing contains a level detector 19b which determines the changing levels of electro-rheological fluid within the housing. In operation, the signal generated by the level detector is processed by the on-board computer.

The electrode configurations of the present invention are now described with reference to FIGS. 4A–4D, 5, 6 and 7. While the present invention utilizes one of four possible electrode configurations, in each of the embodiments, a perforated or flow-through member contains a sequence of electrodes which when activated by an electronic impulse, generate a plurality of electric fields which solidify the electro-rheological fluid within the perforations, and prevent the fluid from flowing through the solidified member. The solidified member serves as a piston which compresses the remaining electro-rheological fluid contained in the housing against the valve left member thereby opening the valve.

Figure 4B:
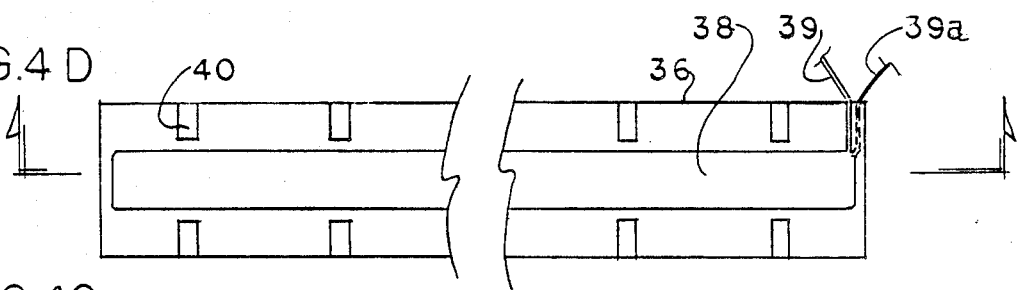
FIG. 4B is a section view of the spiral ring electrode configuration utilized in the preferred embodiment.
Figure 4B:
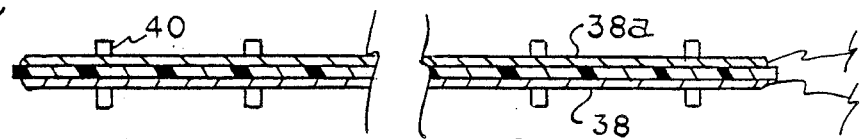
Figure 4B:
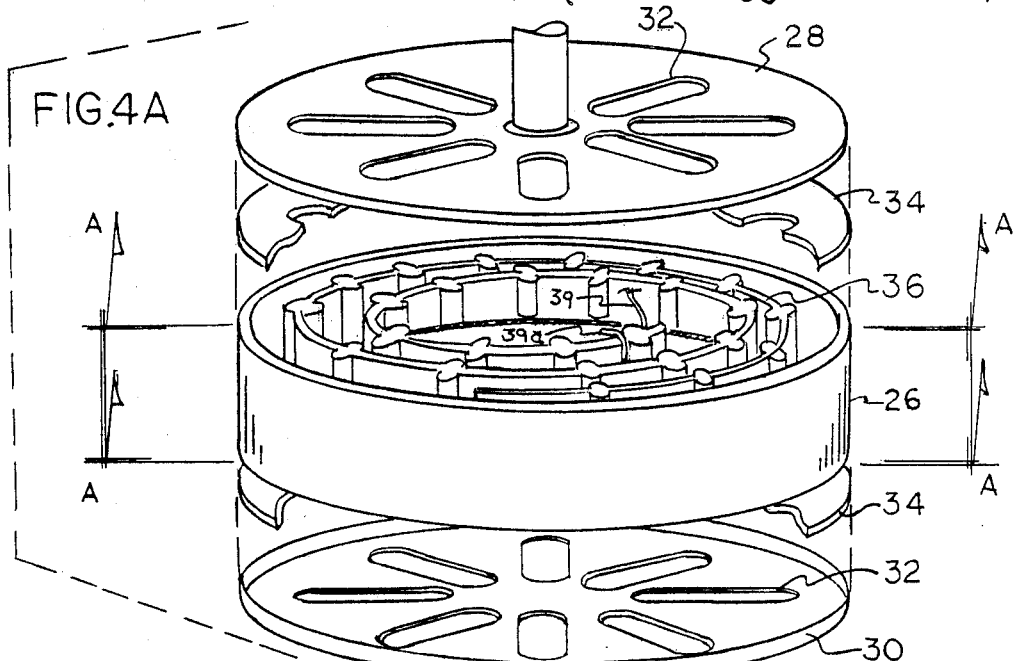
Figure 4B:
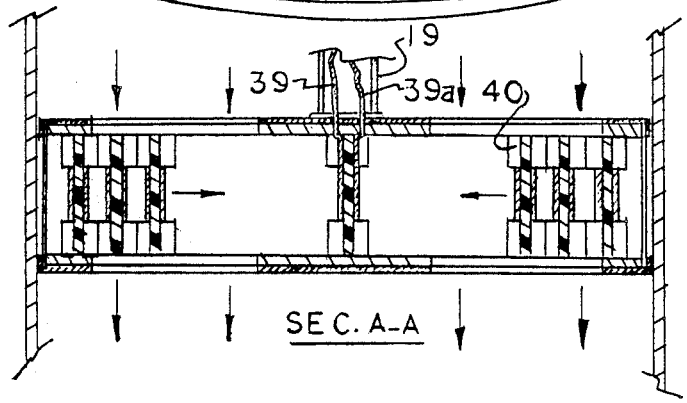

As shown in FIG. 4A–4D, the first flow through member comprises a hollow cylindrical housing 26 having respective top and bottom plates 28, 30, each having a plurality of elongated radial apertures 32. The top and bottom plates 28, 30 each compress respective perforated insulative layers 34. The perforations of the insulative layers align with apertures 32 on the top and bottom plates. The housing 26 contains a spiral thermally resistant polymer, mylar or plastic band or coil 36 which is coated with a metallic electrode 38, 38a on each of its sides. The metallic coatings 38, 38a can consist of copper, aluminum, silver, nickel or any other electrically conductive material. The band turns are separated by plastic ribs 40 which create both channels for fluid flow as well as maintain the electrical integrity of the coil. At the center of the spiral, one metallic band 38 is connected to a positive terminal 39 with the other being connected to a negative terminal 39a. The electric wiring may extend through hollow rod 19 (FIG. 4B) and is connected through wear strip 18 to the on-board computer or microprocessor. As shown in FIG. 4B, the spiral coil thus effectively forms a wound alternating sequence of positive and negative terminals. When the electrodes 38, 38a are activated, fluid flowing through the apertures is solidified by the electric field formed between the walls of the spiral coil. The reciprocating flow through piston member 20 thus becomes a solid plunger which applies a downward thrust against the remaining electro-rheological fluid in the housing 13 and the valve lift member 22. The valve lift member 22 pushes against the valve train 23 and lifts the valve.

Figure 5:
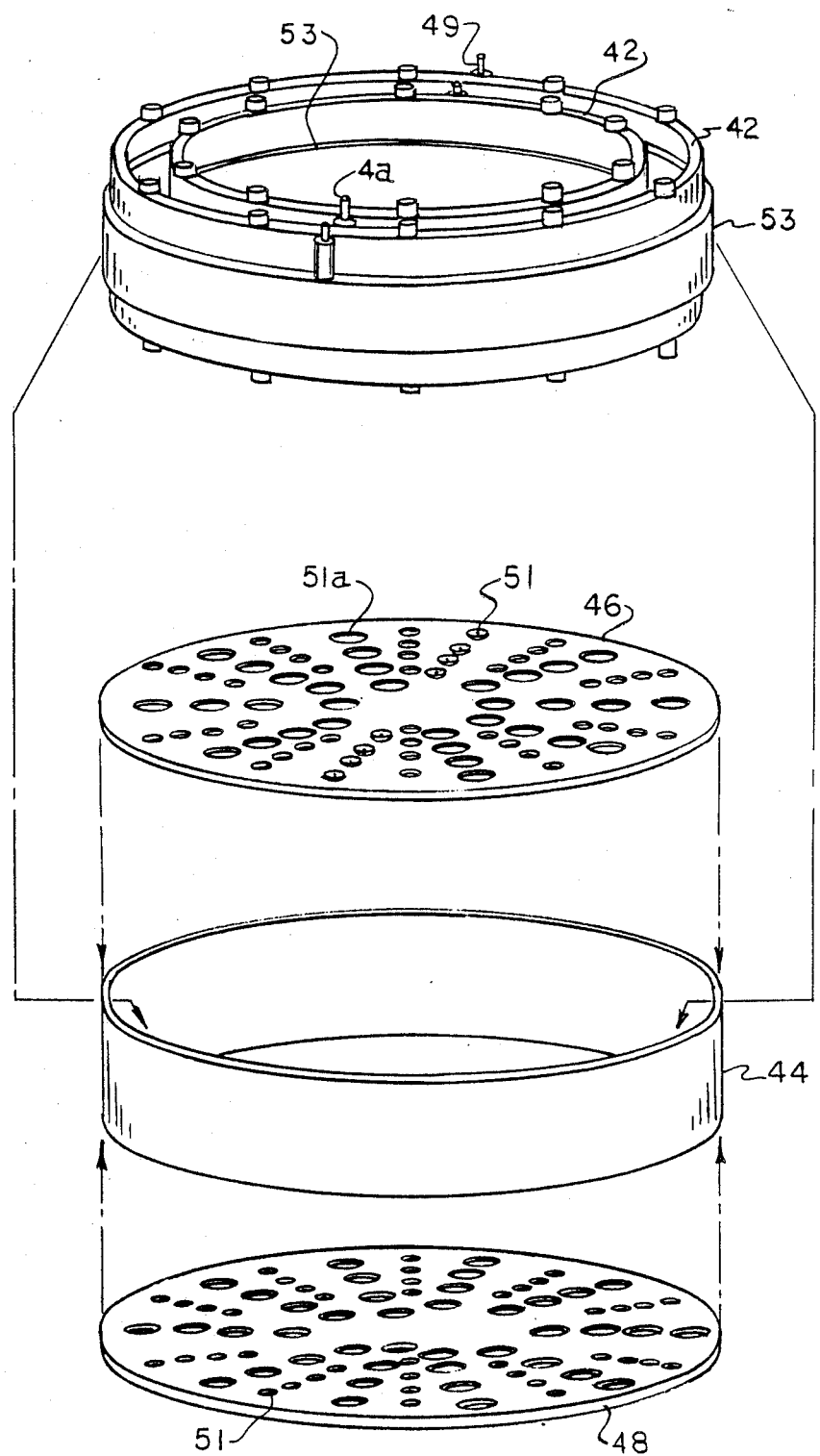
FIG. 5 is a configuration showing concentric rings or cylinders for electrodes utilized in the valve controller of the preferred embodiment.

Referring to FIG. 5, the flow through piston member comprises a sequence of concentric flat rings, cylinders or bands 42. As with the first electrode configuration of FIGS. 4A–4D, the flat concentric rings, cylinders or bands 42, which may be constructed from temperature resistant polymer fit within a cylindrical housing 44 and contain respective top and bottom perforated plate member 46, 48. The plates have holes 51a for electro-rheological fluid flow. Each ring is coated on opposite sides with a flat ring or band electrode 53 which is then connected to either a positive and negative terminal 49 to holes 51 and through to rod 19. In operation, electro-rheological fluid flows between the concentric electrode rings and into the upper portion of the housing. When the plunger member 20 is electrified, a plurality of electric fields are created between the electrodes on the concentric bands thereby solidifying the electro-rheological fluid situated therebetween. As with the embodiment of FIGS. 4A-4D, upon the activation of an electrical impulse, the perforated plunger transforms into a solid piston.

Referring to FIGS. 7 and 7A, the perforated member 20 contains a multiple sequence of perforated metallic disk-shaped wafers 54 through which the electro-rheological fluid flows. The wafers form flow through screens, are configured alternatingly in a positive to negative relationship, and are retained in a noncontacting position by posts 56 or by separator ring washers. In this embodiment, the housing may itself serve as the negative terminal, with alternating wafers being maintained in electrical contact with the housing. The positive wafers are electrically insulated from the negative piston head and are in contact with a positive terminal which is insulated from the housing and which extends through the rod 19 to wear strip 18. In operation, it may be desireable to offset the wafers in order to improve solidification and the pressure characteristics of the plunger. During operation, fluid flows through the parallel disposed disk shaped wafers. When the electrodes are activated, a multiplicity of electric fields are generated between the respective positive and negative terminals formed by the wafers. The electro-rheological fluid within the piston head solidifies and the piston member forms a solid plunger. The solidified plunger compresses the remaining electro-rheological fluid and pushes upon the valve train thereby lifting the valve. It is to be appreciated by those skilled in the art that the screens may be disaligned in order to facilitate complete solidification.

A final embodiment of the electrode is illustrated in FIG. 6. As with the previous embodiments, the piston head comprises a cylindrical casing having perforated top and bottom members 58, 62. The casing contains a molded temperature resistant plastic or ceramic disk 60. Disk 60 contains numerous radially extending apertures through which electro-rheological fluid can flow and which are mated with the top and bottom members. The opposite sides of each radial aperture 63, 63a are parallel and equidistant and are coated or plated with copper or other conductive metal and function as respective positive and negative electrodes. The width of each aperture should be between 0.5 and 1.5 millimeters. Electro-rheological fluid flows through the apertures until electrified. When the electrodes are activated, the electro-rheological fluid contained within each aperture solidifies, and the flow through member forms a solid plunger.

The four electrode configurations of the present invention have been described with reference to an electrode configuration extending through the wear strip. It will be immediately apparent to those skilled in the art that other methods exist for electrifying the electrodes. These include, for example, the use of copper slip rings or bands on the tappet contacted by brushes on the outer casing and the use of induction coils located within the tappet and plunger. It is to be appreciated by those skilled in the art that a ring or band electrode may be provided along the to prevent blowby around the piston head.

Figure 8:
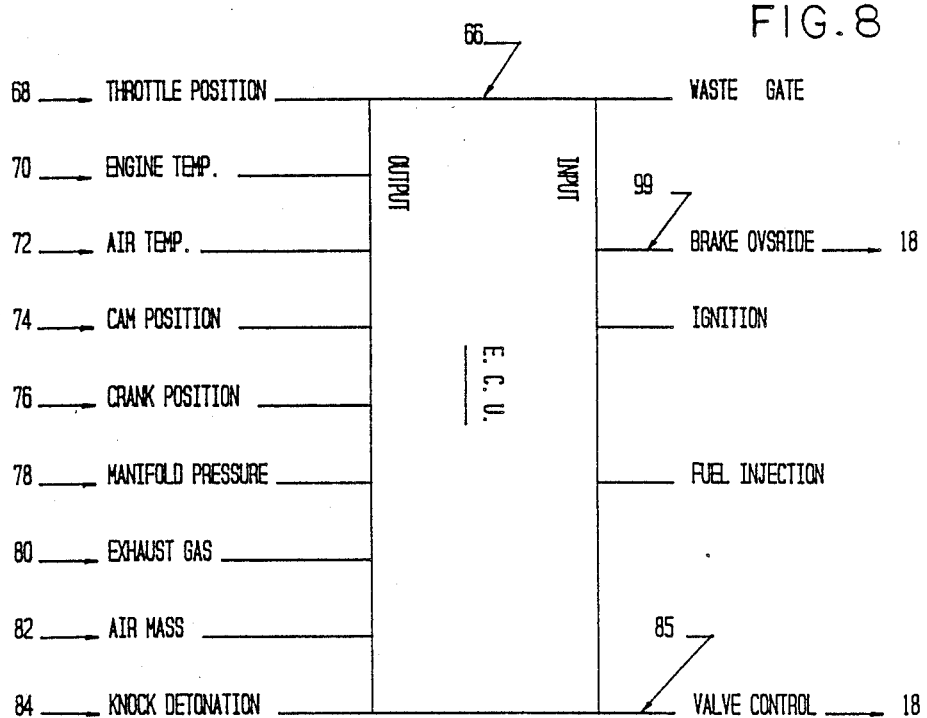
FIG. 8 is a block representation of the computer control system for the preferred embodiment.

The control unit 66 for the preferred embodiment is now described with reference to FIG. 8. The control unit comprises a conventional microprocessor or computer which provides timing signals to control the electrification of the electro-rheological fluid contained within the valve controller chamber. The valve controller is adjusted by varying the timing of the activation of the signals. The electronic computer received continuous operating data from the engine. The computer or microprocessor receives feedback from such parameters as the throttle position 68, engine temperature 70, air temperature 72, cam position 74, crank position 76, manifold pressure 78, exhaust 80, air mass 82 and knock detonation 84, and signals from level detector 19b. Timing signals are accordingly provided to the electrodes by wires contained within the wear strip 18 via valve control 85, or by the other alternative means for electrifying the electrodes.

The operation of the embodiment is now disclosed with reference to all the enclosed Figures. The present invention is designed to be utilized in an internal combustion engine in association with a cam shaft. As the cam profile changes with the rotation of the cam shaft, the cam face pushes down on tappet 14. The tappet 14 forces down the connected perforated piston member 20 having one of the face configurations shown in FIGS. 4A-4D, 5, 6 and 7. During the periods when the electrodes are not activated, electro-rheological fluid flows through the face of the perforated member 20 as it is thrust into the housing 13. When the perforated member having one of the electrode configurations herein described is activated by the computer or microprocessor control system, the electrodes contained within the face of the piston 20 activate. The perforated member instantaneously (within one millisecond) solidifies the electro-rheological fluid 24 and prevents further flow of fluid through the perforations. The continued downward thrust caused by the cam pushes against the remaining electro-rheological fluid in housing 13 and the fluid pressure against the valve lifter 22 opens the valve. By adjusting the timing and duration of the electrode activation, the timing and duration of valve lift can be precisely controlled. Timing is controlled by the processor which outputs signals in response to a series of operating parameters.

An alternative embodiment of the invention is illustrated in FIG. 2. The alternative configuration comprises the valve lifter of the preferred embodiment. Instead of the perforated plunger of FIGS. 4A-4D, 5, 6 and 7, the alternative embodiment invention incorporates a solid plunger 20, with by-pass conduit 11. The by-pass conduit 11 contains a perforated member which incorporates one of the electrode configurations shown in FIGS. 4A-4D, 5, 6 and 7. In the alternative embodiment, when the tappet 14 is pushed downward into the cylindrical chamber, described above, a solid plunger 86 exerts a downward force against the electro-rheological fluid contained in the housing 13. The electro-rheological fluid enters the by-pass channel 11 and flows through the electrodes 22'. Upon the application of an electrical impulse to the perforated member, the fluid within the member solidifies. The electrification of the perforated member blocks off the flow of electro-rheological fluid through the by-pass channel. The downward thrust of the tappet and plunger against the remaining electro-rheological fluid contained within the chamber, pushes against the valve lift member and lifts the valve. This embodiment further incorporates a one way valve 88 which facilitates the rapid outflow of electro-rheological fluid from the by-pass channel to the main chamber on the up-stroke of the lifter. In addition, a one way valve 88a may also be located in the plunger head in order to enable fluid to return to the upper chamber on the upstroke.

Figure 10:
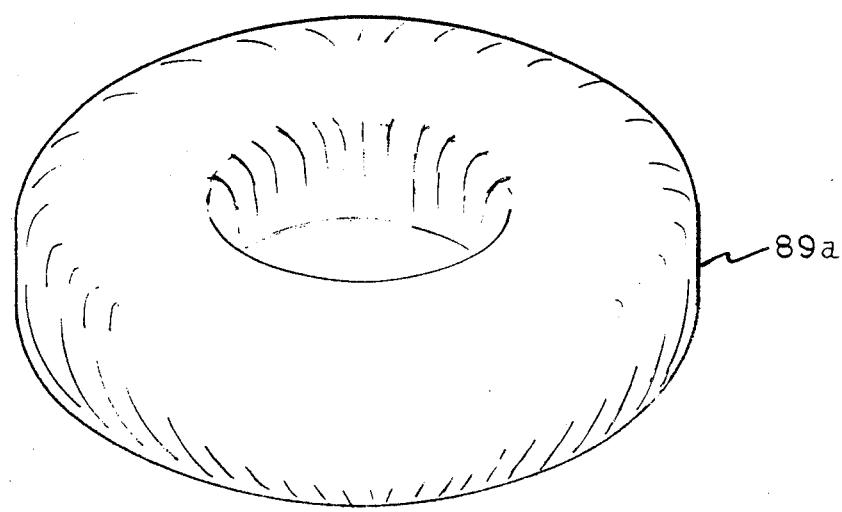
FIG. 10 is a section view of a nitrogen filled neoprene balloon utilized in the present invention.
Figure 10A:
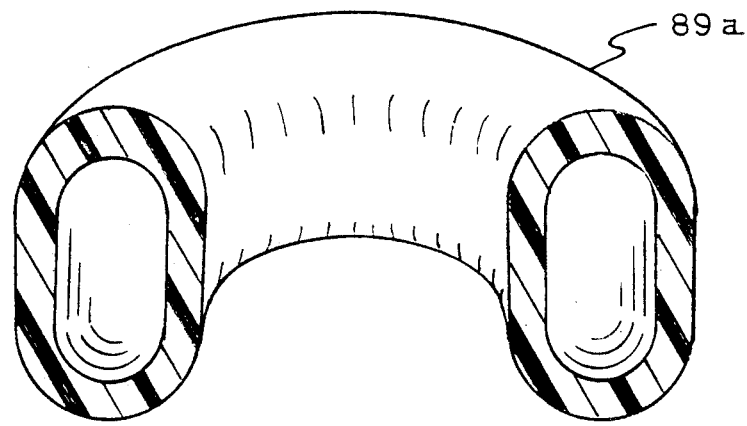
FIG. 10A is a perspective view of the nitrogen filled neoprene balloon utilized in the present invention.

It will be understood and appreciated by those skilled in the art that provision should be made for the thermal expansion and the volumetric change caused by the movement of the piston rod 19 into the electro-rheological fluid chamber. The present invention incorporates a small chamber 87 in contact with the housing 13. In addition, a floating diaphragm 89 is also provided to account for the volumetric changes resulting from the depression of the tappet during the downstroke. It will be appreciated by those skilled in the art that additional mechanisms can be utilized to compensate for thermal and volumetric expansion of the electro-rheological fluids including the provision of a bubble of nitrogen gas in the compression chamber, or a nitrogen bubble in expansion chamber 87. Referring to FIG. 10, a nitrogen filled neoprene balloon 89a may also be utilized to compensate for the thermal expansion of the electro-rheological fluid. The neoprene balloon 89a is shown in FIG. 2 and FIGS. 10 and 10a.

Figure 3A:
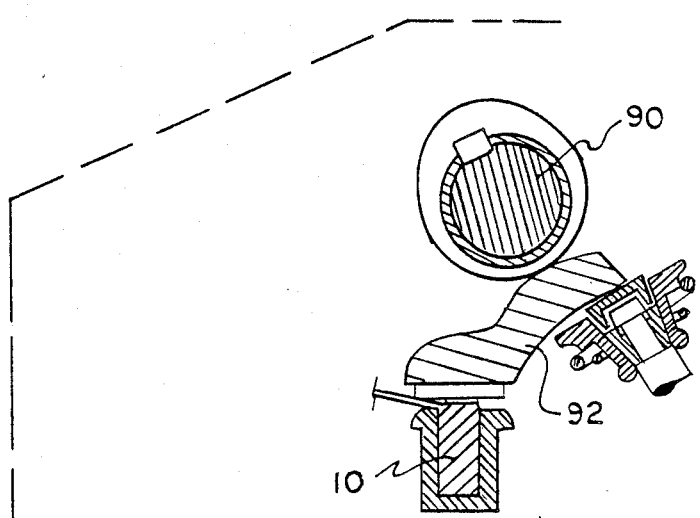
FIGS. 3A-3C illustrate the valve controller of the present invention in different cam and position configurations.
Figure 3B:
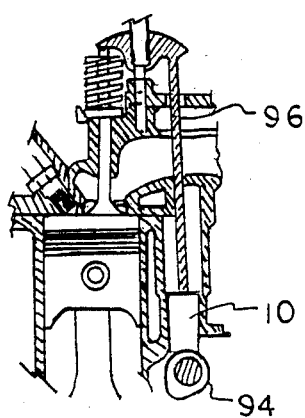
Figure 3C:
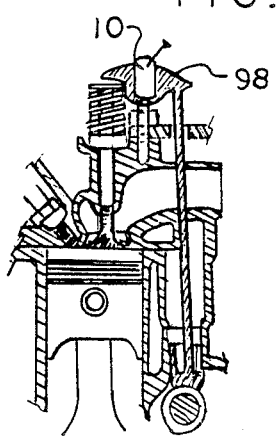

Referring to FIGS. 3A-3C, three positional configurations for the valve controller of the preferred and alternative embodiments are shown. FIG. 3A illustrates the use of the present invention in an overhead camshaft 90 with rocker arm configuration 92. FIG. 3B illustrates the use of the present invention in an engine with low camshaft 94 and push rod 96. FIG. 3C illustrates the valve controller of present invention positioned over the rocker arm pivot point 98. The present invention can be replaced as a unit.

A final aspect of the electro-rheological valve lift, timing and control system of the present invention is its application for use as a compression braking mechanism. As noted above in the Background of the Invention section, compression braking has been extensively utilized in heavy four cycle diesel truck engines. In all prior art systems, compression braking is performed by opening the compression cycle. In compression braking, the fuel supply is turned off and the engine functions as an air pump which operates to retard the pistons and drive shaft. All previous attempts at compression braking have required separate hydraulic or solenoid devices to open the exhaust valve(s) at an appropriate juncture when the compression brake is applied. The present invention can be modified to provide normal valve lift operation and compression braking.

As shown in FIG. 1A, the bottom of the piston member and the top of the valve lift member may include respective contact members 100, 100a. While the contact members secure the biasing spring, their length represents a preset distance near the point of complete extension. During normal operation, fuel is injected into the engine and valve lift timing is controlled by the microprocessor in accordance with the dynamic parameters of the engine. When the brakes are applied, however, fuel injection to the engine is immediately terminated and the normal opening of the exhaust valve is delayed. Concurrently, the intake valve(s) (also controlled by the disclosed valve controller) are also deactivated. In operation, the low signal port from 99 the microprocessor overrides and deactivates the electro-rheological fluid. The tappet 14 and plunger 20 move down into the chamber until the respective contact members 100, 100a meet. This point corresponds to a point near the completion of the exhaust stroke and will provide an amount of lift (approximately 0.04 to 0.045 inches). Compressed air exits through the exhaust valve thereby representing a loss of energy in the system. Alternatively, the microprocessor may signal the valve controller when to open the intake/exhaust valve, instead of employing the contact means. Accordingly, the present invention can be can be utilized as a component in an overall computer or microprocessor based system to provide both valve lift, deactivation, and compression braking.

It will be understood by those skilled in the art, that the disclosed electro-rheological valve controller means may be housed in a cylindrical body as a replaceable unit, and can have the general configuration of a conventional hydraulic valve lifter, and be located as usual in the reciprocating valve train, and itself reciprocating with the valve/cam tappet; and having its internal plunger capable of extension and retraction so as to change the over-all length of the unit, on command from the microprocessor. In this application, the internal plunger will not be required to make a separate relative movement with each tappet reciprocation; that is, its movement relative to its corresponding members will be required or needed only for a change in valve lift, therefore, there is no fluid movement in the unit during the same valve lift setting, with less wear and fluid heating; no rapid internal reciprocation will be thus required. In this application, lash occurring during partial lift or full deactivation can be eliminated, or be absorbed, by a relatively weak coil spring urging the valve train elements apart; and thus clatter, wear, etc. is eliminated or minimized.

Figure 9:
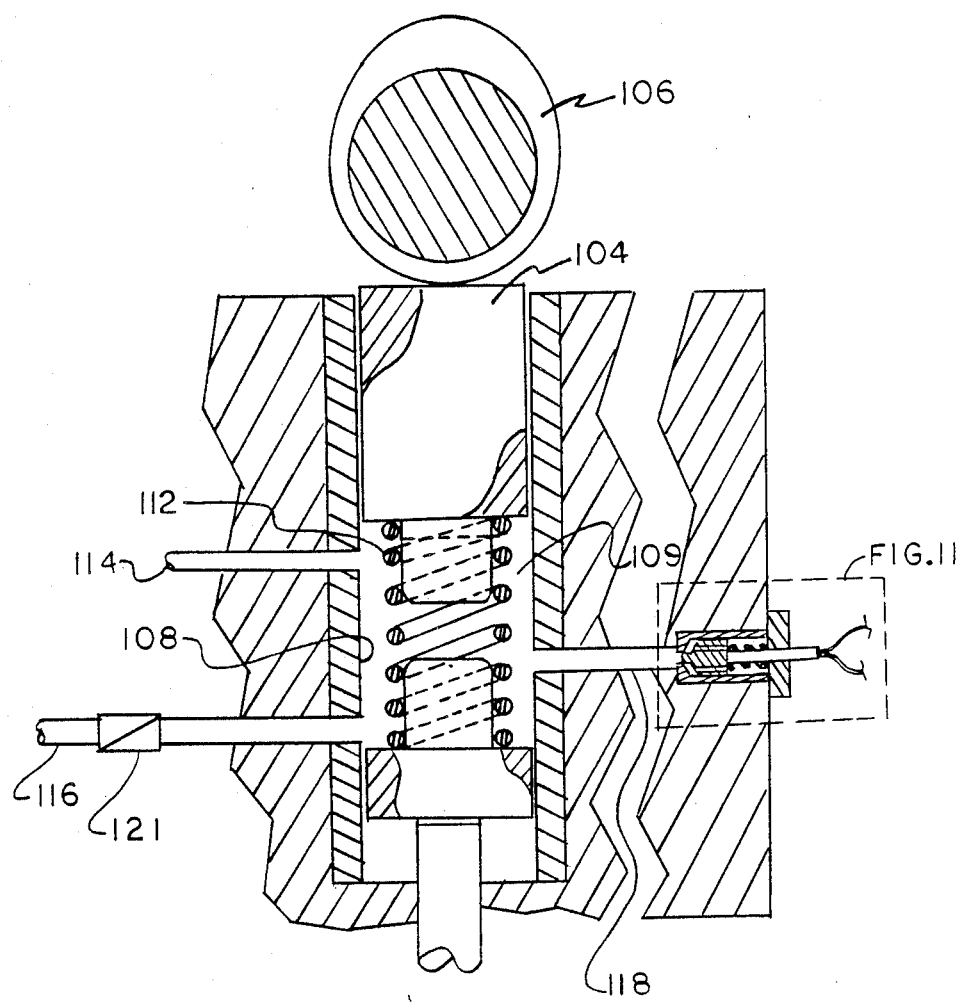
FIG. 9 is a section view of a valve control mechanism of the present invention which incorporates hydraulic fluid and an electro-rheological control valve.

While the present invention has been described in context of a valve controller in which an electro-rheological fluid is contained within the main chamber or, alternatively, forced into a by-pass channel, it is to be recognized that the present invention can be utilized in coordination with a standard hydraulic valve lifter in which an electro-rheological control valve having an electrode configuration in accordance with the present invention, is utilized. Referring to FIG. 9, the valve controller comprises a conventional tappet 104 which is thrust downward by a rotating face cam 106. The tappet extends into a valve chamber 108 which is filled with a hydraulic fluid or oil 109. The valve lifter 110 is separated from the tappet by the hydraulic fluid or oil. A biasing spring 112, situated within the hydraulic fluid, separates the tappet and valve lifter, and maintains the tappet in contact with the cam 106. The central chamber holding the hydraulic fluid or oil 109 contains three ports, 114, 116, 118. Fluid enters through port 114 and exits port 116, or alternatively may exit through outlet 118 which is controlled by an electro-rheological control valve 120. Port 116 is controlled by a one-way check valve 121.

Figure 11:
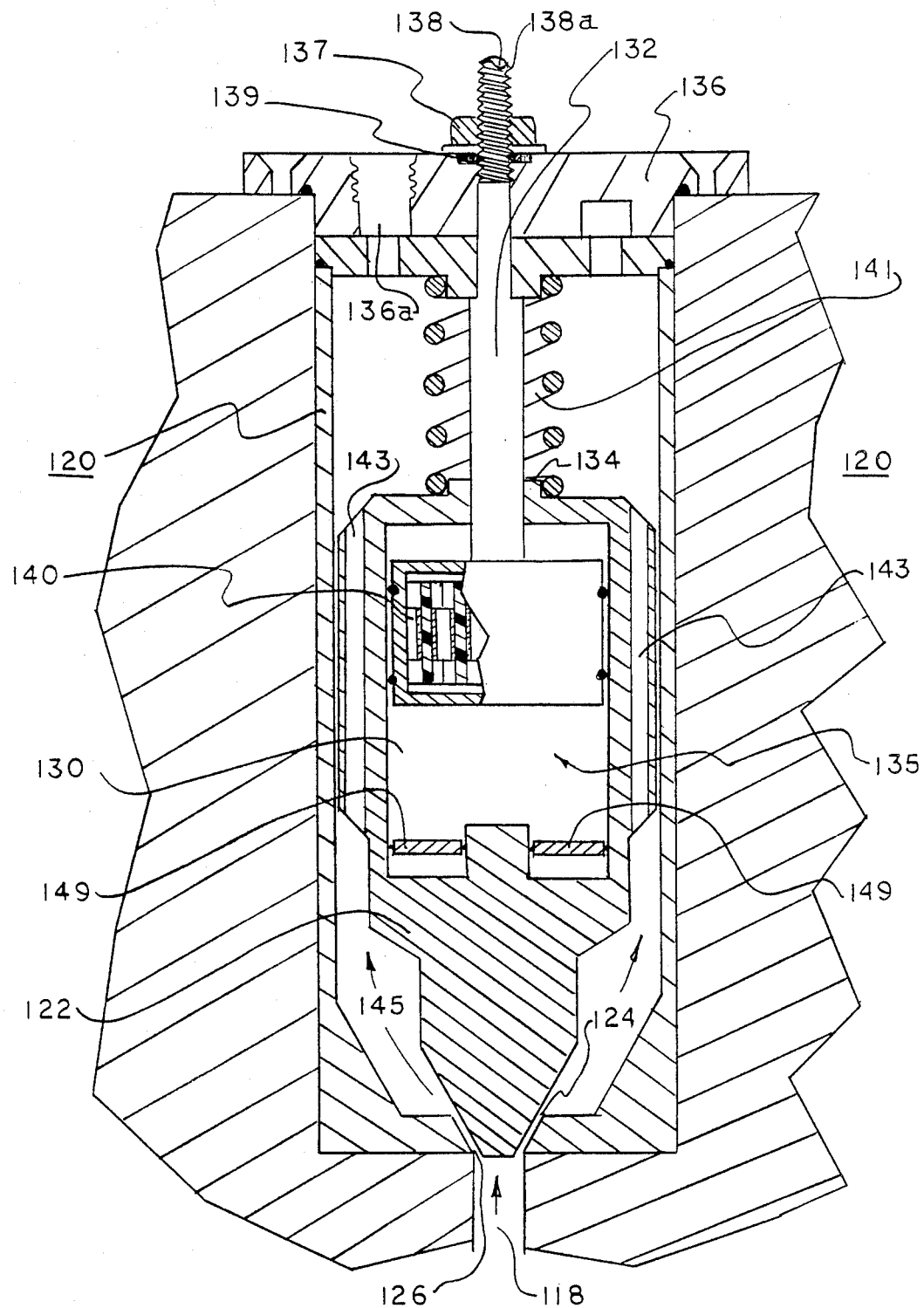
FIG. 11 is a section view of an electro-rheological control valve to be utilized in the embodiment of FIG. 9.

As shown in FIG. 11, the valve 120 comprises a floating head 122 with a land 124 which slidably mates with a valve seat 126 located on the conduit extending from outlet 118. The floating head 128 oscillates in a longitudinal direction with respect to an arm member 132. The center of the head is hollow and contains electro-rheological fluid 130. The arm 132 extends into the center of the valve, through a central bore 134 and into the cavity 135. The arm 132 is retained by a retaining plate 136 and gland 137 and gasket 139. The end plate 136 has a hole 136a for permitting flow out of the valve. The arm has electrode wires 138, 138a which extend through the center of the hollow cavity 135. Attached to the arm is a perforated electrode member 140 (partially broken away) which has one of the four embodiments set out in FIGS. 4A-7. In operation, the valve oscillates with respect to the perforated electrode 140 contained within the cavity. A biasing spring 141 forces the valve toward a closed position. An annular conduit 143 bored into the casing permits hydraulic fluid or oil to flow between the valve seat and outlet 136a.

In operation, as the cam rotates, the tappet 104 is pushed downward thereby creating a hydraulic pressure on the fluid contained within the valve chamber. The fluid accordingly attempts to exit through outlets 114, 116, and 118. A fluid pressure will accordingly be created on the face of the electro-rheological valve blocking conduit 118. The valve member will tend to be thrust inwardly and unseat, thereby enabling flow of hydraulic fluid or oil flow through channel 145 and into the annular conduit 143. By applying and varying an electrical signal to the perforated electrode 140, the valve member can be locked in place, thereby preventing the outflow of fluid from outlet 118. This will accordingly create a compressive fluid force against the valve lifter and accordingly lift the valve. Two diaphragms 149 compensate for volumetric changes in the electro-rheological fluid.

Figure 12:
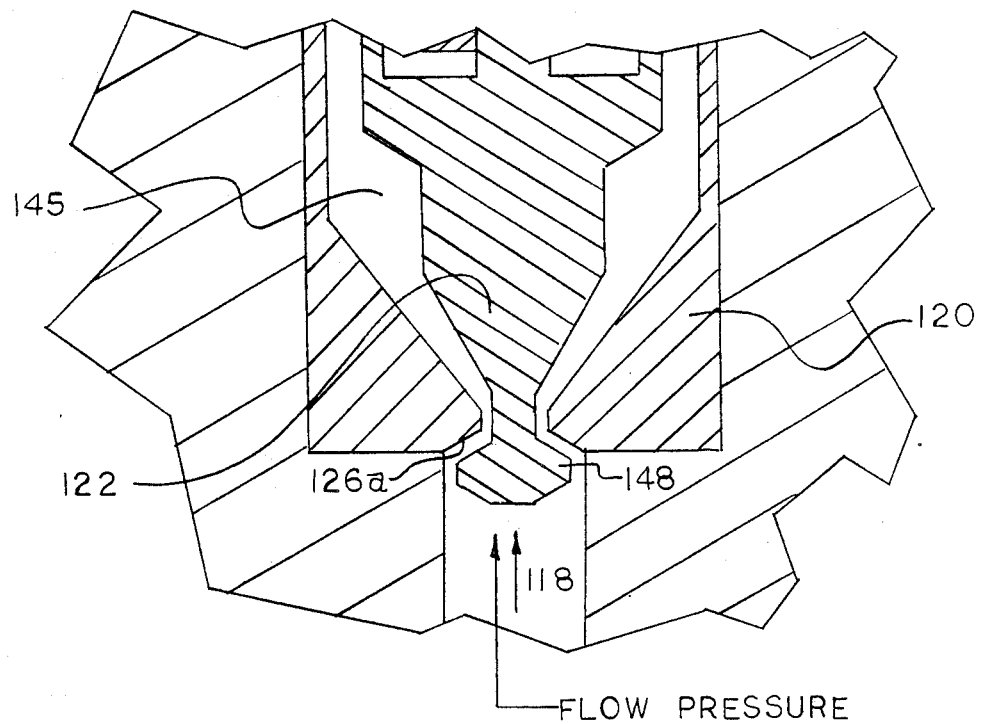
FIG. 12 is a section view of an alternative electro-rheological control valve to be utilized in the embodiment of FIG. 9.

FIG. 12 illustrates an analog to the valve controller shown FIG. 11. The valve is identical to the valve controller of FIG. 12 except the valve is biased open. The valve land 148 extends into conduit 118. Upon the application of a fluid pressure, caused by the downward thrust of the tappet, the valve is forced closed against seat 126a. By applying an electric potential to the perforated electrode, the valve can be locked open until a desired moment of closure.

Figure 13:
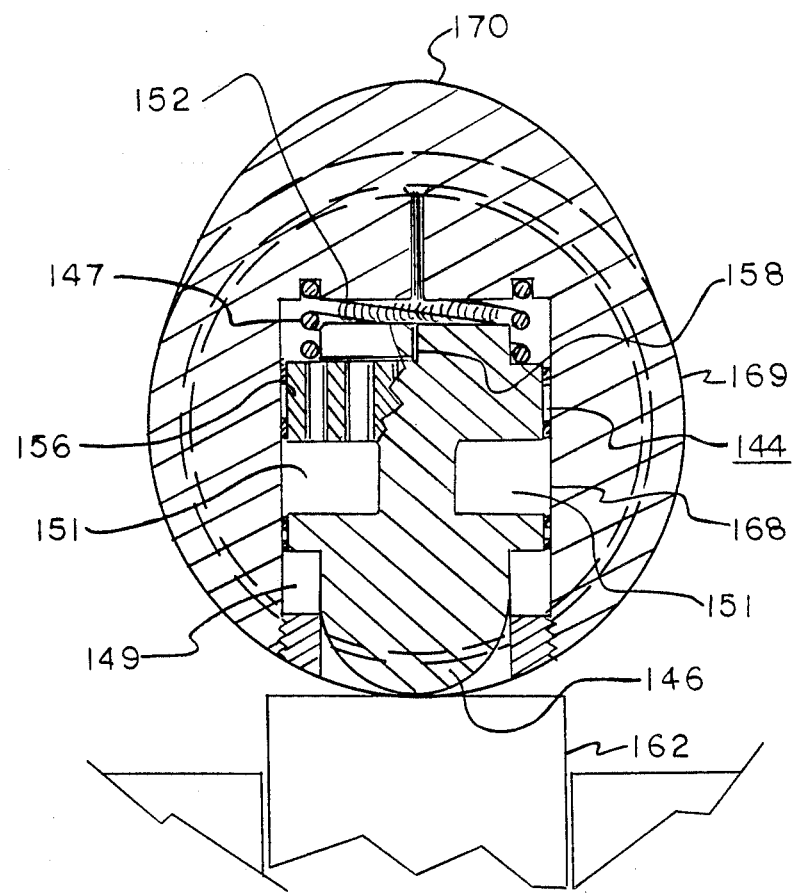
FIG. 13 is a section view of an electro-rheological control valve which is incorporated within the engine valve cam.
Figure 13A:
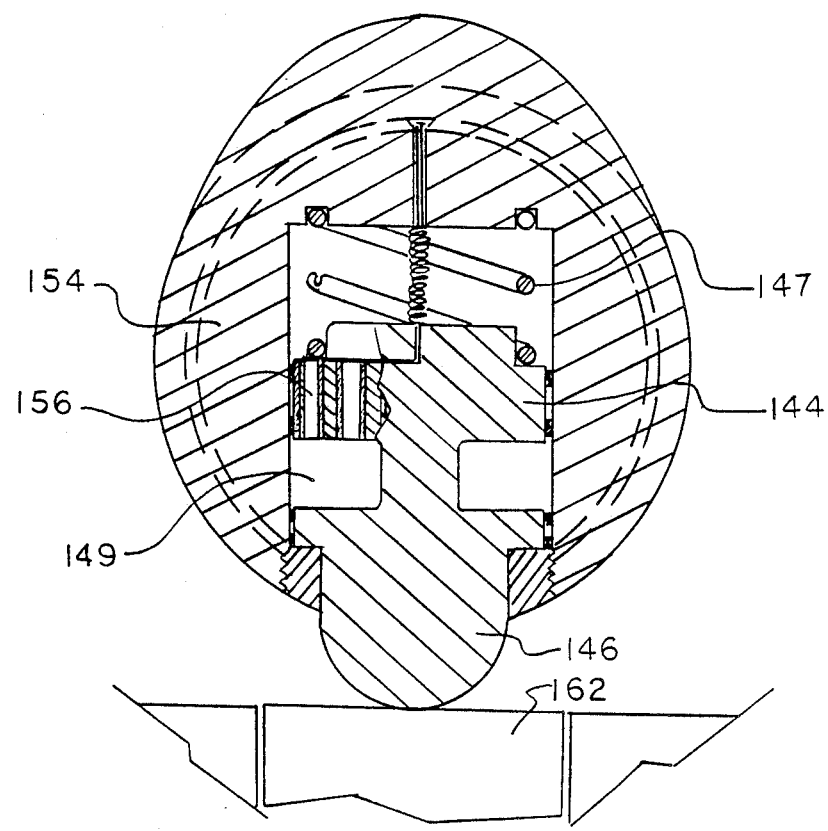
FIG. 13A is a section view of the electro-rheological control valve of FIG. 13 in a retracted position.

In a final embodiment of the present invention shown in FIGS. 13 and 13a, the electro-rheological valve controller 144 is utilized within the cam itself. This embodiment is particularly suitable for compression braking. The valve controller 144 is housed within a cylindrical cavity 168 of the cam 169 opposite the main cam lobe 170. A retractable boss 146 housed within the cam controlled by the electro-rheological controller of the present invention, pushes down against the tappet 162. The controller and boss are biased outward by a biasing spring 147. The controller with boss is hollow, and contains a cavity 149 filled with electro-rheological fluid 151. A coil 152 connected to the drive shaft 154 extends into the electro-rheological fluid contained within the cavity.

A perforated electrode member 156 having one of the configurations shown in FIG. 4A-7, extends into the electro-rheological fluid contained within the cavity. The reciprocating boss oscillates relative to the electrode 156. The perforated electrode 156 contains electrode wires 158 which electrify the electrode. The electrode is connected to coil 152 which transmits current emanating from the cam 169. Electric current can be transmitted to the cam from the drive shaft via rings and brushes (not shown). When the perforated electrode is electrified, the electro-rheological fluid 151 contained therein solidifies. A compressive fluid pressure is created within the boss, thereby resulting in the locking of the position of the controller and boss.

The operation of the cam based controller is shown with reference to FIG. 13 and 13A. As the cam with controller and boss rotates, the main lobe serves to periodically depress the valve tappet 162. When no electric potential is applied, the biased controller and boss are compressed into the cam as they ride over the tappet, resulting in no lifting. When an electric potential is applied to the electrode via coil 152, the perforated electrode 156 solidifies, thereby locking position of the controller and boss in place, and further resulting in a compression of the tappet 162 and the lifting of the valve. By controlling the length and timing of the application of potential to the electrode within the cam, the profile and duration of valve lift, opposite the main cam lobe, can be precisely controlled. This embodiment can provide an alternative mechanism for producing compression braking.

An alternative means for accomplishing compression braking utilizes the electro-rheological controller within the tappet itself instead of the cam itself, as shown in FIGS. 13 and 13a. In this alternative adaption, the compression is released during the compression stage, as is presently used in conventional compression braking systems. A double lobe cam is used in cooperation with a double lifter assembly, somewhat similar to the arrangement described in Wagner U.S. Pat. No. 3,277,874. The cam is provided with two sets of cam surfaces of differing contours, comprising a lobe for normal operation and a lobe for lifting the exhaust valve for compression release during the compression stage, when the system is activated.

The double lifter assembly includes an outer lifer and an inner lifter which is slidably contained in the outer lifter and urged outward by a coil spring. The outer lift is normally supported on the outer cam lobe, and performs the normal valve action. The inner lifter in the form of a plunger is co-axial with and slidably supported within the outer lifter. During normal engine operation the exhaust valve assembly operates as usual, being lifted by the outer lifter actuated by the outer or normal cam lobe. During compression braking, the inner lifter is urged outward from the lifter assembly by a coiled spring and it mates with the inner cam lobe (which is contoured for compression braking). The inner lifter is locked when it reaches its extended position by the electro-rheological controller. When the inner lifter is locked in its extended position, it then follows the inner cam lobe and thus the entire lifter assembly (i.e. the "tappet") moves in cooperation with the inner cam contour. The exhaust valve will then open as desired for compression braking during the latter part of the compression stroke and will function in the manner that the exhaust valves do in conventional compression braking systems.

The foregoing invention has been described with reference to the above disclosure. It is to be recognized by those skilled in the art that other embodiments fall within the spirit and scope of the invention and that the true scope of the invention is to be examined with reference to the claims appended hereto.

What is claimed is:

1. An electro-rheological valve controller comprising:
   a generally cylindrical casing holding an electro-rheological fluid;
   a reciprocating tappet attached at one end of the cylindrical casing, said tappet contacting cam means for thrusting said tappet into said casing toward a reciprocating valve lift member;

a plunger member coupled to said tappet, said plunger being perforated to permit the flow of electro-rheological fluid therethrough;

a reciprocating valve lift member situated within said casing and separated from said perforated plunger member by said electro-rheological fluid, said lift member communicating with a valve to be lifted; and electrode means coupled to said perforated plunger member for generating an electric field within said perforated plunger member such that said electro-rheological fluid within said perforated plunger member solidifies, whereby said plunger applies a compressive fluid force against said reciprocating lift member thereby lifting said valve to be lifted.

2. The electro-rheological valve controller, of claim 1 further comprising biasing means between said perforated plunger member and said reciprocating valve lift member.

3. The electro-rheological valve controller of claim 1 wherein said perforated plunger member comprises a cylindrical disk having a plurality of apertures extending therethrough to permit the flow of electro-rheological fluid through said disk, each of said apertures containing a negative and positive electrode such that when said electrodes are activated, an electric field is generated in each aperture, thereby solidifying the electro-rheological fluid contained therein.

4. The electro-rheological valve controller of claim 3 wherein the width of each of said apertures is between 0.5 and 1.5 millimeters.

5. The electro-rheological valve controller of claim 1 wherein said perforated member comprises a spiral coil member contained within a perforated cylindrical casing, said spiral coil member containing positive and negative electrodes located on opposite sides of said spiral coil such that said spiral coil forms an alternating sequence of positive and negative terminals, whereby the application of an electrical impulse to said electrodes generates a plurality of electric fields within said spiral coil thereby solidifying the electro-rheological fluid within said coil.

6. The electro-rheological valve controller of claim 5 further comprising a plurality of rib members attached to said spiral for maintaining the electrical integrity of said spiral coil when it is placed within said perforated cylindrical casing.

7. The electro-rheological valve controller of claim 1 wherein said perforated member comprises a plurality of concentric cylinders, each of said cylinders having a positive electrode on a first side and a negative electrode on a second side, the positive electrode on a first band being in proximity to a negative electrode on a second band, such that upon the application of an electric signal to said electrodes, a plurality of electric fields are formed between said cylinders and the electro-rheological fluid between said cylinders solidifies.

8. The electro-rheological valve lifter of claim 7 wherein said concentric cylinders are retained within a hollow cylindrical casing having top and bottom members, said top and bottom members being perforated so as to permit the flow of electro-rheological fluid through said cylindrical casing.

9. The electro-rheological valve controller of claim 1 in which said perforated member comprises a hollow casing supporting a plurality of parallel disposed perforated disk-shaped metallic wafer members, said metallic wafer members forming a sequence of alternating positive and negative electrodes such that upon the application of an electrical impulse to said wafer members, a plurality of electric fields is formed between said alternating wafer members, thereby solidifying the electro-rheological fluid situated therebetween.

10. The valve controller of claim 1 further comprising processor means for controlling the activation of said electrodes, said processor means generating signals in accordance with the dynamic parameters of the engine.

11. The valve controller of claim 1 wherein said cam contains electro-rheological means for adjusting the profile of said cam.

12. The valve controller of claim 11 wherein said electro-rheological means for adjusting the profile of said cam comprises:

a cylindrical chamber bored radially into said cam;

a profile boss housed within said chamber which oscillates in a radial direction, the radial outward extension of said boss altering the profile of said cam, said boss having a cavity containing an electro-rheological fluid;

means for biasing said boss in a radially outward direction; and perforated electrode means electrically connected to said cam and extending into said electro-rheological fluid within said cavity for solidifying said electro-rheological fluid within said cavity upon the application of an electric impulse so as create a compressive force against said boss, thereby locking its position, and altering the profile of said cam.

13. An electro-rheological valve controller which functions as a compression brake comprising:

a generally cylindrical casing holding an electro-rheological fluid;

a reciprocating tappet attached at one end of the cylindrical casing, said tappet contacting cam means for thrusting said tappet into said casing toward a reciprocating lift member;

a plunger member coupled to said tappet, said plunger member being perforated to permit the flow of electro-rheological fluid therethrough;

a reciprocating lift member situated within said casing and separated from said perforated plunger member by a biasing spring and said electro-rheological fluid, said lift member communicating with a valve to be lifted;

electrode means coupled to said perforated plunger member for generating an electric field within said perforated plunger member such that said electro-rheological fluid within said perforated plunger member solidifies, whereby said perforated plunger member applies a compressive fluid force against said reciprocating lift member, which thereby lifts said valve to be lifted;

means for deactivating said electrodes during braking;

contact means coupled to the perforated or plunger for contacting the valve lift member during braking and lifting said valve for compression braking.

14. The electro-rheological controller of claim 13 wherein said cam means contains variable electro-rheological activation means for depressing said tappet.

15. The valve controller of claim 13 wherein said contact means contacts said valve lift member near the completion of the exhaust stroke of a four-cycle engine.

16. An electro-rheological valve controller comprising:
- a generally cylindrical casing for holding an electro-rheological fluid;
- a reciprocating tappet attached at one end of the cylindrical casing, said tappet being in communication with cam means for thrusting said tappet into said casing;
- a reciprocating piston member connected to said tappet, said piston member being disposed to thrust into said casing;
- a reciprocating valve lift member situated within said casing and separated from said reciprocating piston member by a biasing spring and said electro-rheological fluid, said reciprocating valve lift member being in contact with a valve to be lifted;
- a by-pass conduit integral to said casing and situated between said piston and said valve lift member for the flow of electro-rheological fluid from said casing during the downward thrust of said piston;
- a perforated member situated within said by-pass conduit to permit the flow of electro-rheological fluid therethrough; and
- electrode means coupled to said perforated member for generating an electric field within said perforated member such that said electro-rheological fluid contained therein solidifies, bypass conduit and thereby creating a compressive fluid force by said piston member against said reciprocating lift member for lifting a valve.

17. The electro-rheological valve controller of claim 16 wherein said perforated member comprises a cylindrical disk having a plurality of apertures extending therethrough for the flow of electro-rheological fluid, each of said apertures containing an oppositely disposed negative and positive electrode, such that when said electrodes are activated, an electric field is generated in each aperture, thereby solidifying the electro-rheological fluid contained therein.

18. The electro-rheological valve controller of claim 16 wherein said perforated member comprises a spiral coil member contained within a cylindrical casing, said spiral coil member containing positive and negative electrodes on opposite sides of said spiral coil such that said coil forms an alternating sequence of positive and negative terminals, whereby upon the application of an electrical impulse to said electrodes, a plurality of electric fields are formed between the electrodes on said spiral coil and the electro-rheological fluid situated within said coil solidifies.

19. The electro-rheological valve controller of claim 18 further comprising a plurality of rib members attached to said spiral coil for maintaining the electrical integrity of the spiral coil when it is housed within said casing.

20. The electro-rheological valve controller of claim 16 in which said perforated member comprises a plurality of concentric bands, each of said bands having a positive electrode on a first side and a negative electrode on a second side, the positive electrode on a first band being in proximity to a negative electrode on a second band, such that upon the application of an electric signal to said electrodes, a plurality of electric fields situated between said bands solidifies.

21. The electro-rheological valve controller of claim 20 wherein said concentric rings are retained within a hollow cylindrical casing having top and bottom members, said top and bottom members being perforated so as to permit the flow of electro-rheological fluid through said cylindrical casing.

22. The electro-rheological valve controller of claim 16 in which said perforated member comprises a hollow casing supporting a plurality of parallelly disposed perforated disk-shaped metallic wafer members, said metallic wafer members forming a sequence of alternating positive and negative electrodes such that upon the application of an electrical impulse to said wafer members, a plurality of electric fields is formed between said alternating wafer members, thereby solidifying the electro-rheological fluid within said hollow casing.

23. The electro-rheological valve controller of claim 16 further comprising a wear strip between said cam means and said reciprocating tappet to alleviate tappet and cam spalling and to provide more convenient maintenance shims.

24. The valve controller of claim 16 further comprising one way valve means to facilitate the flow of electro-rheological fluid in said housing during the upstroke.

25. The valve controller of claim 16 further comprising means for compensating for the volumetric changes in said electro-rheological fluid.

26. The valve controller of claim 25 wherein said compensating means is a nitrogen filled neoprene balloon.

27. An electro-rheological valve controller comprising:
- a generally cylindrical casing for holding a compression fluid;
- a reciprocating tappet attached at one end of the cylindrical casing, said tappet being in communication with cam means for thrusting said tappet into said casing;
- a reciprocating piston member connected to said tappet, said piston member being disposed to thrust into said casing;
- a reciprocating valve lift member situated within said casing and separated from said reciprocating piston member by a biasing spring and said compression fluid, said reciprocating valve lift member being in contact with a valve to be lifted;
- a conduit extending out of said casing for the flow of compression fluid from said casing during the downward thrust of said piston;
- electro-rheological valve means in communication with said conduit for controlling the flow of compression fluid through said conduit so as to impede the flow of compression fluid into said conduit and thereby creating a compressive fluid force by said piston member against said reciprocating lift member for lifting a valve.

28. The electro-rheological valve controller of claim 27 wherein said electro-rheological valve means comprises an selectively movable valve member for opening and closing off said conduit, said valve member having a cavity containing an electro-rheological fluid;
- a perforated electrode member located within said valve casing, said valve member selectively movable with respect to said perforated electrode member; and
- means for electrifying said perforated electrode member such that the electro-rheological fluid within said electrode solidifies, thereby locking the position of said valve member relative to said electrode.

* * * * *

UNITED STATES PATENT AND TRADEMARK OFFICE
CERTIFICATE OF CORRECTION

PATENT NO. : 4,930,463
DATED : June 5, 1990
INVENTOR(S) : Nicholas S. Hare, Sr.

It is certified that error appears in the above-identified patent and that said Letters Patent is hereby corrected as shown below:

| | |
|---|---|
| Col. 4, line 34: | after "conjunction" "wit" should be --with-- and add --the drawings appended hereto. For the purpose of illustrating the -- before "invention," |
| Col. 8, line 2: | after "along the" add --inside of the casing and surrounding the perforated member so as-- |
| Col. 8, line 39: | after "and" add --effectively transforms the member into a solid plunger which-- |
| Col. 8, line 54: | "20," should be --20'-- |
| Col. 9, line 46: | after "opening the" add --exhaust valve at a predetermined point near the completion of the-- |
| Col. 15, line 27: | after "solidifies," add --thereby impeding the flow of electro-rheological fluid into said-- |

Signed and Sealed this

Twenty-first Day of January, 1992

Attest:

HARRY F. MANBECK, JR.

*Attesting Officer*  *Commissioner of Patents and Trademarks*